United States Patent
Snyder et al.

(10) Patent No.: US 8,506,414 B2
(45) Date of Patent: *Aug. 13, 2013

(54) GOLF CLUB SLEEVE AND GOLF CLUBS FOR USE THEREWITH

(75) Inventors: Jeremy Snyder, Ft. Worth, TX (US); Michael G. Taylor, Granbury, TX (US); Byron Cole Slaughter, Granbury, TX (US); John T. Stites, Weatherford, TX (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,040

(22) Filed: May 20, 2011

(65) Prior Publication Data
US 2011/0218048 A1   Sep. 8, 2011

Related U.S. Application Data

(63) Continuation of application No. 12/639,130, filed on Dec. 16, 2009, now Pat. No. 7,951,013.

(51) Int. Cl.
*A63B 69/36* (2006.01)

(52) U.S. Cl.
USPC .......................................... 473/228; 473/226

(58) Field of Classification Search
USPC ............. 473/219, 226, 228, 230, 231, 256, 473/316–323, 457
See application file for complete search history.

(56) References Cited

U.S. PATENT DOCUMENTS

| | | | | |
|---|---|---|---|---|
| 2,313,391 | A * | 3/1943 | Newton | 62/212 |
| 2,910,297 | A | 10/1959 | Bonetate | |
| 3,565,444 | A * | 2/1971 | La Rocca | 473/228 |
| 5,058,890 | A * | 10/1991 | Szabo | 473/457 |
| 5,165,683 | A | 11/1992 | Beutler et al. | |
| 5,415,406 | A * | 5/1995 | Reichenbach et al. | 473/228 |
| 5,571,048 | A * | 11/1996 | Kenney | 473/228 |
| 5,711,718 | A | 1/1998 | Mueller | |
| 5,921,870 | A | 7/1999 | Chiasson | |
| 6,027,414 | A * | 2/2000 | Koebler | 473/228 |
| 6,238,299 | B1 | 5/2001 | Barnette | |
| 6,561,922 | B2 | 5/2003 | Bamber | |
| 6,609,981 | B2 | 8/2003 | Hirata | |
| 6,866,592 | B1 * | 3/2005 | Gitre | 473/228 |
| 7,118,490 | B2 * | 10/2006 | Namba | 473/228 |
| 7,494,420 | B1 * | 2/2009 | Whalen | 473/228 |

(Continued)

FOREIGN PATENT DOCUMENTS

| | | |
|---|---|---|
| GB | 2 387 121 | 10/2003 |
| WO | 2009-065172 | 5/2009 |

OTHER PUBLICATIONS

International Search Report and Written Opinion received for corresponding PCT Application No. PCT/US2010/057014 mailed Jun. 10, 2011.

*Primary Examiner* — Nini Legesse
(74) *Attorney, Agent, or Firm* — Banner & Witcoff, Ltd.

(57) ABSTRACT

A golf club sleeve for use with various golf club structures is presented. The golf club sleeve may have an airfoil shaped cross section and may extend over at least a portion of the shaft of the golf club to reduce drag associated with the shaft during a golf swing, thereby increasing swing speed. The golf club sleeve may be rotatable relative to the shaft of the golf club to orient itself during a swing in order to improve air flow over the sleeve.

33 Claims, 12 Drawing Sheets

(56) References Cited

U.S. PATENT DOCUMENTS

| | | | |
|---|---|---|---|
| 7,497,785 B2* | 3/2009 | Koncelik, Jr. | 473/228 |
| 7,951,013 B1* | 5/2011 | Snyder et al. | 473/228 |
| 2003/0195063 A1 | 10/2003 | Koncelik, Jr. | |
| 2006/0014588 A1 | 1/2006 | Page | |
| 2011/0009208 A1* | 1/2011 | Roger et al. | 473/317 |

* cited by examiner

GOLF CLUB SLEEVE AND GOLF CLUBS FOR USE THEREWITH

RELATED APPLICATIONS

This application is a continuation of U.S. Ser. No. 12/639,130, filed Dec. 16, 2009, now allowed, and entitled "Golf Club Sleeve And Golf Clubs For Use Therewith." The above mentioned application is incorporated herein by reference in its entirety.

FIELD OF THE INVENTION

The present invention relates generally to golf clubs and golf club accessories. Particular example aspects of this invention relate to a golf club sleeve that extends over at least a portion of a shaft of a golf club to reduce drag associated with the shaft during a golf swing.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

One aspect of the game that impacts performance is a player's swing and, in particular, swing speed. Swing speed is the speed at which a player moves his club through a swing and can often affect the distance a ball is hit. For instance, as a golfer swings the club from the end of the backswing through contact with the ball, the speed of the swing may have an impact on the flight of the ball, distance the ball will travel, etc. Increasing the swing speed may, in some arrangements, increase the distance a golf ball will travel. However, swing speed is impacted by the geometry of the golf club. As air flows over the golf club during the swing, various portions of the golf club, and the shaft in particular, create drag through the air which reduces swing speed. Accordingly, it would be advantageous to reduce the drag associated with the shaft during a golf swing in order to increase swing speed.

SUMMARY OF THE INVENTION

Aspects of this invention relate to a golf club sleeve that may be used with various types of golf clubs, including wood-type golf clubs, hybrid golf clubs, iron-type golf clubs, and the like. The golf club sleeve may fit around and over at least a portion of the shaft of the golf club and may be freely rotatable relative to the shaft of the golf club. This rotatable connection may aid in permitting the golf club sleeve to orient itself during a golf swing to increase air flow over the golf club sleeve, thereby reducing drag associated with at least the shaft of the golf club.

The golf club sleeve may include a bearing member such as ball bearings, or other type of non-friction transition, at a connection point with the golf club, such as at the hosel. In some examples, the golf club sleeve may be formed of lightweight materials, such as carbon composite materials, in order to reduce weight associated with the golf club sleeve.

In some examples, the golf club sleeve may be releasably or removably connected to the golf club such that a player may selectively connect or detach the golf club sleeve as desired. The golf club sleeve may include a closure mechanism to secure the golf club sleeve to the golf club, such as mechanical fasteners, snap-fits, hook and loop type closures, and the like.

BRIEF DESCRIPTION OF THE DRAWINGS

The present invention is illustrated by way of example and not limited in the accompanying figures, in which like reference numerals indicate similar elements throughout, and in which.

Figure 1A:
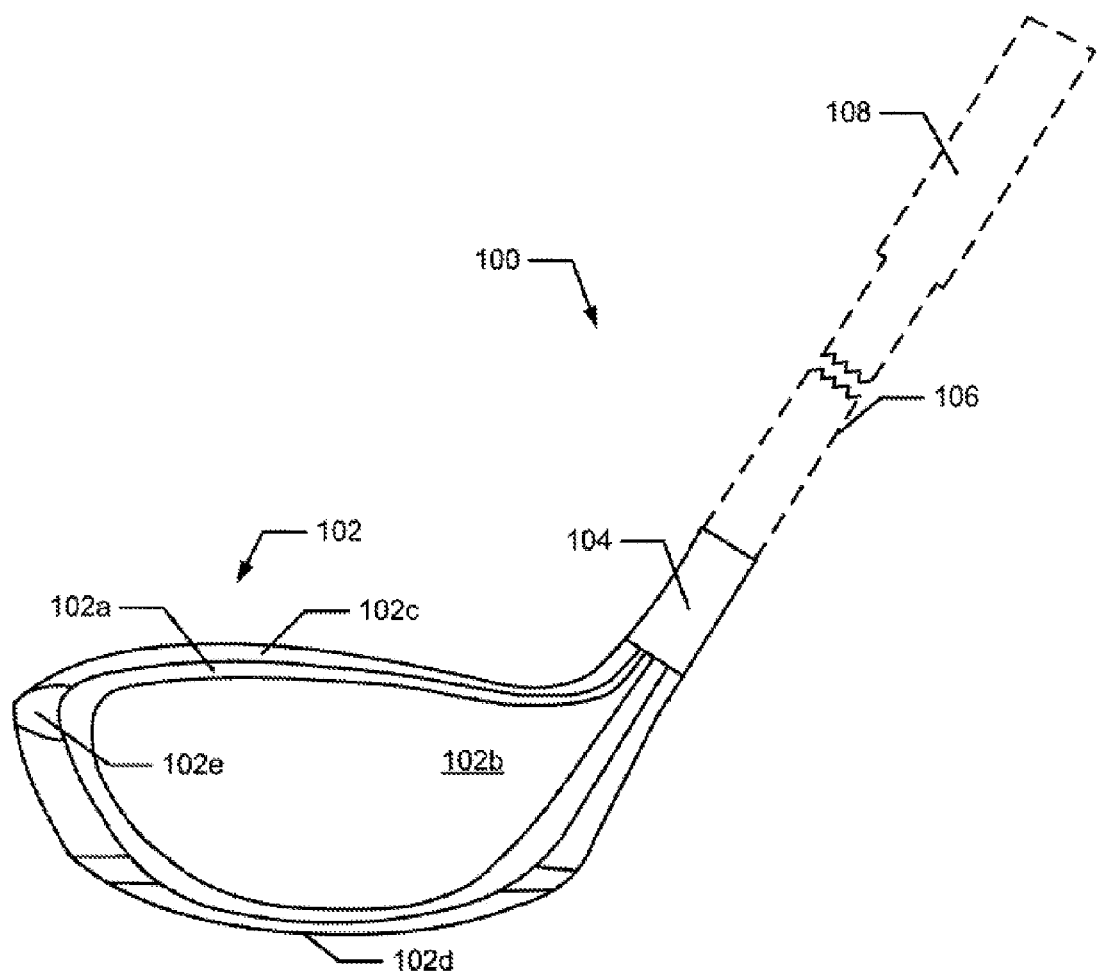
FIGS. 1A and 1B generally illustrate features of club head structures according to at least some examples of this invention.

The reader is advised that the various parts shown in these drawings are not necessarily drawn to scale.

DETAILED DESCRIPTION

The following description and the accompanying figures disclose features of golf club accessories, such as golf club sleeves, in accordance with examples of the present invention.

I. General Description of Example Golf Club Sleeves for use with Various Golf Clubs in Accordance with this Invention Aspects of this invention relate to golf club accessories, including a golf club sleeve, for use with various types of golf clubs. In at least some examples, golf clubs according to aspects described herein may include a golf club head and a shaft having a first end connected to the golf club head at a hosel. The golf club may further include a golf club sleeve extending over the shaft and surrounding the shaft, the golf club sleeve being formed of a substantially rigid material and being freely rotatable relative to shaft. In some arrangements, the golf club may also include a reduced-friction transition connecting the golf club sleeve to the hosel. In some examples, the reduced-friction transition may include ball bearings. In some arrangements, the golf club sleeve may extend over substantially all of the shaft of the golf club and may have a cross section having an airfoil shaped geometry to reduce drag associated with the shaft during a golf swing.

Still additional aspects of this invention relate to golf clubs that may include a golf club head and a shaft having a first end to which the golf club head is connected. The golf club may further include a golf club sleeve extending over the shaft and surrounding the shaft, the golf club sleeve having a cross-section corresponding to an airfoil and being removably connected to the golf club and rotatable relative to the shaft. In some examples, the cross section corresponding to the airfoil includes a leading edge, a trailing edge, and a midsection extending between the leading edge and the trailing edge. Further, a thickness of the sleeve may be greatest at a portion of the midsection.

In at least some examples, the golf club sleeve may further include at least one closure mechanism for securing the golf club sleeve to the golf club. The closure mechanism may include at least one snap fits, mechanical fasteners, hook and loop type closures, and snaps. The golf club sleeve may connect to the golf club at a hosel and the connection may include a reduced-friction transition that may, in some arrangements, include ball bearings. The golf club sleeve may further include an aperture extending through the golf club sleeve and corresponding to the size of the shaft. In some examples, the aperture may be tapered.

Still other aspects of the invention relate to a golf club sleeve. The golf club sleeve may include a sleeve body having an airfoil shaped cross section, the sleeve body including a leading edge, a trailing edge and a mid-section extending between the leading edge and the trailing edge, wherein the thickness of the body in at least a portion of the midsection is greater than the thickness of the sleeve body at the leading edge and the trailing edge; and an aperture extending through the airfoil shaped sleeve body, the aperture being sized to correspond to a shaft of a golf club. In at least some examples, the aperture extends through the entire length of the golf club sleeve.

In some aspects, the golf club sleeve may be rotatable relative to the shaft of the golf club when connected to the golf club. The golf club sleeve may extend over substantially all of the shaft of the golf club when connected to the golf club.

In still other examples, the airfoil shaped cross section of the sleeve body may be tear drop shaped. In some examples, the sleeve body may be formed of a rigid material, such as a composite material. The sleeve body may also include a closure mechanism that may be located at the trailing edge of the sleeve body and may be configured to secure the sleeve body to the golf club.

Given the general description of various example aspects of the invention provided above, more detailed descriptions of various specific examples of golf clubs and golf club head structures according to the invention are provided below.

II. Detailed Description of Example Golf Club Accessories for use with Various Golf Clubs According to the Invention The following discussion and accompanying figures describe various example golf clubs sleeves in accordance with the present invention. When the same reference number appears in more than one drawing, that reference number is used consistently in this specification and the drawings to refer to the same or similar parts throughout.

Various golf club sleeves in accordance with aspects described herein may be used with various types of golf clubs. For instance, the golf club sleeve may be used with wood-type golf clubs and golf club heads, e.g., clubs and club heads typically used for drivers and fairway woods, as well as for "wood-type" utility or hybrid clubs, or the like. Such club head structures may have little or no actual "wood" material and still may be referred to conventionally in the art as "woods" (e.g., "metal woods," "fairway woods," etc.). The golf club sleeves may also be used with iron-type golf clubs and golf club head structures.

The club heads may include a multiple piece construction and structure, e.g., including one or more of a sole member, a face member (optionally including a ball striking face integrally formed therein or attached thereto), one or more body members (e.g., material extending around the perimeter and making up the club head body), a crown member, a face plate, a face frame member (to which a ball striking face may be attached), an aft body, etc. Of course, if desired, various portions of the club head structure may be integrally formed with one another, as a unitary, one piece construction, without departing from the invention (e.g., the body member(s) may be integrally formed with the sole and/or crown members, the face member may be integrally formed with the sole, body, and/or crown members, etc.). Optionally, if desired, the various portions of the club head structure (such as the sole member, the crown member, the face member, the body member(s), etc.) individually may be formed from multiple pieces of material without departing from this invention (e.g., a multi-piece crown, a multi-piece sole, etc.). Also, as other alternatives, if desired, the entire club head may be made as a single, one piece, unitary construction, or a face plate member may be attached to a one piece club head aft body (optionally, a hollow body, etc.). More specific examples and features of golf club heads and golf club structures according to this invention will be described in detail below in conjunction with the example golf club structures illustrated in FIGS. 1 through 6.

Figure 1B:
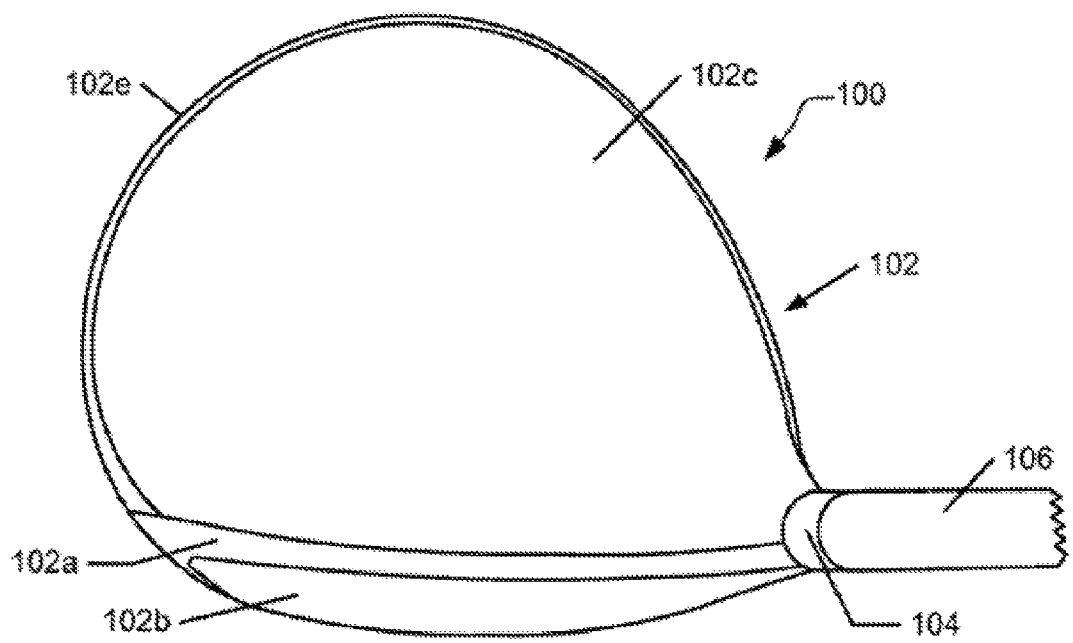

FIGS. 1A and 1B generally illustrate an example wood-type golf club 100 and/or golf club head 102 in accordance with this invention. As mentioned above, aspects of the golf club sleeve described herein may be used with various other types of golf clubs and golf club head structures, including hybrid type clubs, iron-type clubs, and the like. Although the general description of golf club structures found in FIGS. 1A and 1B is generally directed to wood-type golf club heads, nothing in the disclosure should be viewed as limiting use of golf club sleeves as described herein to use with only wood-type golf clubs. Instead, the golf club sleeves described herein may be used with various types of golf clubs without departing from the invention.

In addition to the golf club head 102, the overall golf club structure 100 of this example includes a hosel region 104, a shaft member 106 received in and/or inserted into and/or through the hosel region 104, and a grip or handle member 108 attached to the shaft member 106. Optionally, if desired, the external hosel region 104 may be eliminated and the shaft member 106 may be directly inserted into and/or otherwise attached to the head member 102 (e.g., through an opening provided in the top of the club head 102, through an internal hosel member (e.g., provided within an interior chamber defined by the club head 102), etc.).

The shaft member 106 may be received in, engaged with, and/or attached to the club head 102 in any suitable or desired manner, including in conventional manners known and used in the art, without departing from the invention. As more specific examples, the shaft member 106 may be engaged with the club head 102 via a hosel member 104 and/or directly to the club head structure 102, e.g., via adhesives, cements, welding, soldering, mechanical connectors (such as threads, retaining elements, or the like), etc.; through a shaft-receiving sleeve or element extending into the club head body 102, etc. If desired, the shaft 106 may be connected to the head 102 in a releasable manner using mechanical connectors to allow easy interchange of one shaft for another on the head.

In some examples, the club head/shaft connection may include an "off-axis" or angled bore hole or interior chamber in which the shaft 106 (optionally a straight shaft) is received. More specifically, an outer cylindrical surface of the connection member may extend in a first axial direction, and an interior cylindrical surface of the bore hole may extend in a second axial direction that differs from the first axial direction. In this manner, while the shaft connection member exterior maintains a constant axial direction corresponding to that of the interior of the club head hosel and its opening, the shaft 106 extends away from the club head 102 at a different and, in some examples, adjustable angle with respect to the club head 102 and its ball striking face. Additional aspects of this off-axis arrangement are described in U.S. application Ser. No. 11/846,370 filed Aug. 28, 2007 and entitled "Releasable and Interchangeable Connections for Golf Club Heads and Shafts," which is incorporated herein by reference in its entirety.

The shaft member 106 also may be made from any suitable or desired materials, including conventional materials known and used in the art, such as graphite based materials, composite or other non-metal materials, steel materials (including stainless steel), aluminum materials, other metal alloy materials, polymeric materials, combinations of various materials, and the like. Also, the grip or handle member 108 may be attached to, engaged with, and/or extend from the shaft member 106 in any suitable or desired manner, including in conventional manners known and used in the art, e.g., using adhesives or cements; via welding, soldering, adhesives, or the like; via mechanical connectors (such as threads, retaining elements, etc.); etc. As another example, if desired, the grip or handle member 108 may be integrally formed as a unitary, one-piece construction with the shaft member 106. Additionally, any desired grip or handle member 108 materials may be used without departing from this invention, including, for example: rubber materials, leather materials, rubber or other materials including cord or other fabric material embedded therein, polymeric materials, and the like.

The club head 102 itself also may be any of various types of golf club heads and may be constructed in any suitable or desired manner and/or from any suitable or desired materials without departing from this invention, including from conventional materials and/or in conventional manners known and used in the art. For example, in the exemplary structure 102 shown in FIGS. 1A and 1B, the club head 102 includes a ball striking face member 102a (optionally including a ball striking face plate 102b integrally formed with the face member 102a or attached to the club 100 such that the face plate 102b and a frame member together constitute the overall face member 102a). The club head 102 of this illustrated example further includes a crown 102c, a sole 102d, and at least one body portion 102e located between the crown or top portion 102c and the sole 102d (e.g., material extending from the face member 102a, around the club head periphery from the heel to the toe). This body portion 102e, which extends to a location substantially opposite the striking face member 102a, may include a rear portion of the club head structure. A wide variety of overall club head constructions are possible without departing from this invention. For example, if desired, some or all of the various individual parts of the club head 102 described above may be made from multiple pieces that are connected together (e.g., by welding, adhesives, or other fusing techniques; by mechanical connectors; etc.). The various parts (e.g., crown 102c, sole 102d, and/or body portion(s) 102e) may be made from any desired materials and combinations of different materials, including materials that are conventionally known and used in the art, such as metal materials, including lightweight metal materials. More specific examples of suitable lightweight metal materials include steel, titanium and titanium alloys, aluminum and aluminum alloys, magnesium and magnesium alloys, etc.

As additional examples or alternatives, in order to reduce the weight of the club head 102, if desired, one or more portions of the club head structure 102 advantageously may be made from a composite material, such as from carbon fiber composite materials that are conventionally known and used in the art. Other suitable composite or other non-metal materials that may be used for one or more portions of the club head structure 102 include, for example: fiberglass composite materials, basalt fiber composite materials, polymer materials, etc. The composite or other non-metal material(s) may be incorporated as part of the club head structure 102 in any desired manner, including in conventional manners that are known and used in the art.

The various individual parts that make up a club head structure 102, if made from multiple pieces, may be engaged with one another and/or held together in any suitable or desired manner, including in conventional manners known and used in the art. For example, the various parts of the club head structure 102, such as the face member 102a, the ball striking plate 102b, the crown 102c, the sole 102d, and/or the body portion(s) 102e may be joined and/or fixed together (directly or indirectly through intermediate members) by adhesives, cements, welding, soldering, or other bonding or finishing techniques; by mechanical connectors (such as threads, screws, nuts, bolts, or other connectors); and the like. If desired, the mating edges of various parts of the club head structure 102 (e.g., the edges where members 102a, 102b, 102c, 102d, and/or 102e contact and join to one another) may include one or more raised ribs, tabs, ledges, or other engagement elements that fit into or onto corresponding grooves, slots, surfaces, ledges, openings, or other structures provided in or on the facing side edge to which it is joined. Cements, adhesives, mechanical connectors, finishing material, or the like may be used in combination with the raised rib/groove/ledge/edge or other connecting structures described above to further help secure the various parts of the club head structure 102 together.

The dimensions and/or other characteristics of a golf club head structure according to examples of this invention may vary significantly without departing from the invention.

Figure 2A:
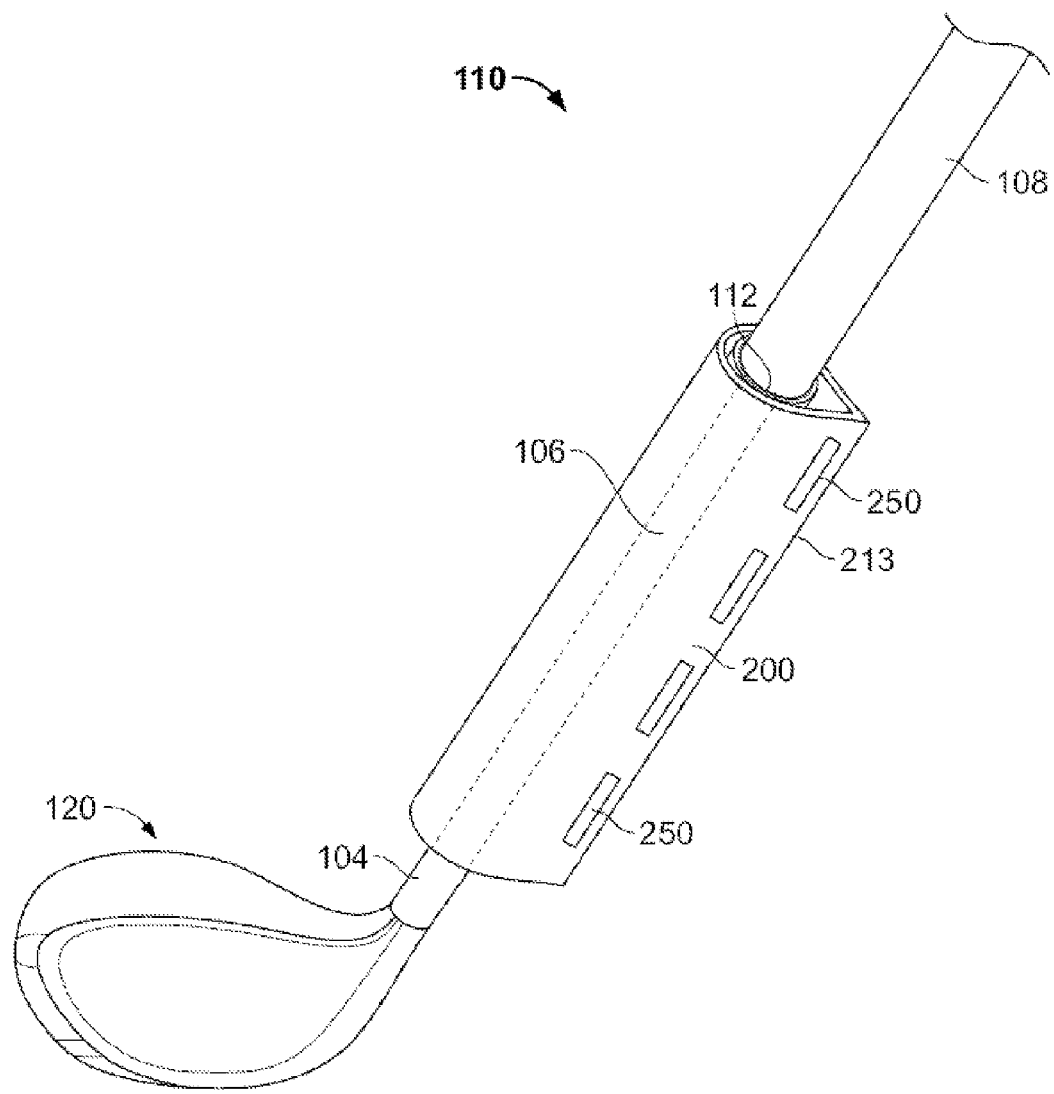
FIGS. 2A and 2B illustrate example golf club sleeves that may be used with various golf clubs in accordance with at least some examples of this invention.
Figure 2B:
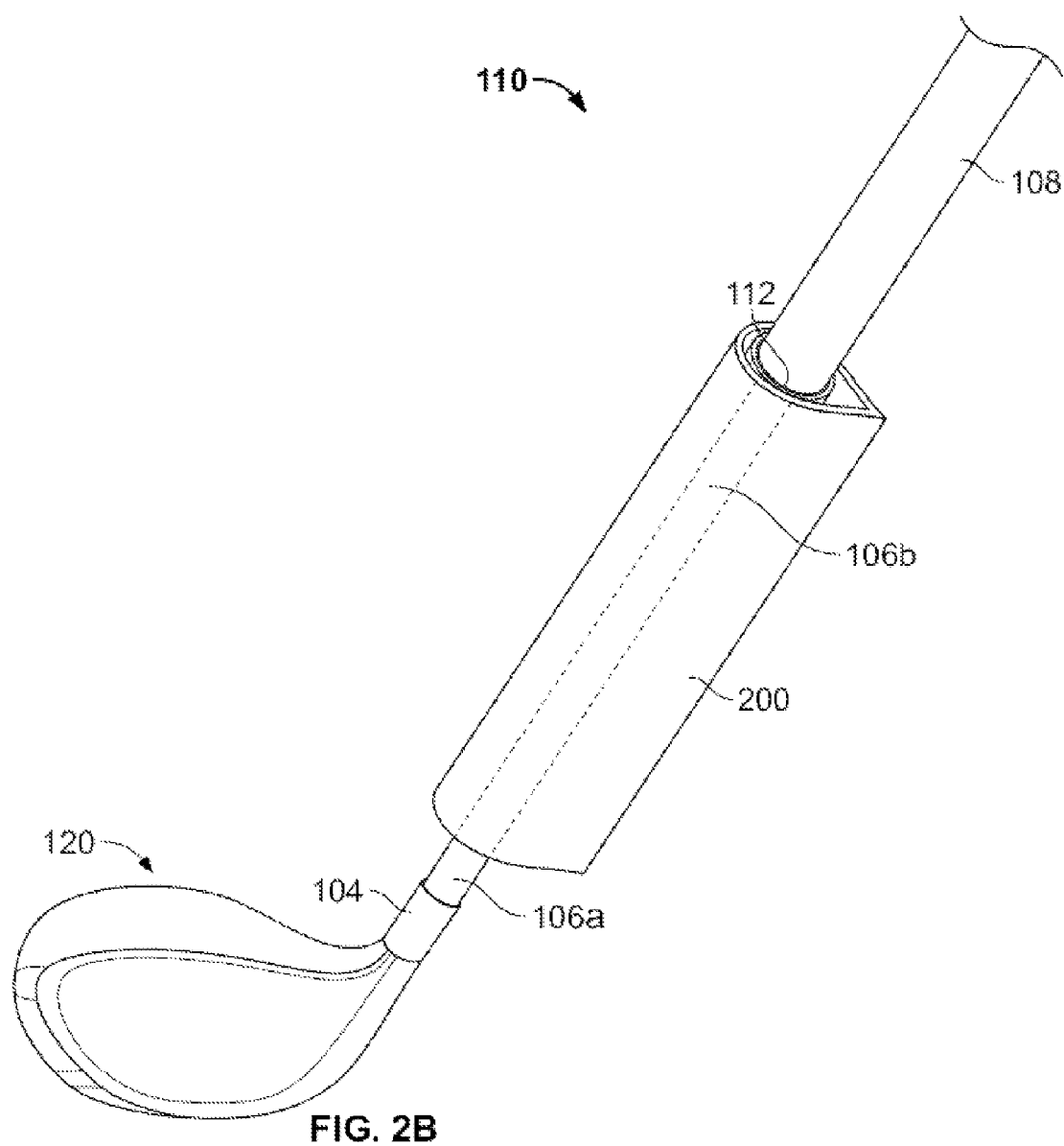

FIGS. 2A and 2B illustrate example golf club shaft sleeves 200 in accordance with aspects of the invention. The golf club sleeve 200, as described herein, may generally cover a shaft 106 of a golf club (such as golf club 100 in FIGS. 1A and 1B) in order to reduce drag associated with the shaft 106 during swinging of the golf club, both for use during practice and during rounds of golf. For instance, in one exemplary embodiment, the sleeve 200 may generally have an airfoil shape. The airfoil shape of the golf club sleeve 200 may generally reduce drag, thereby increasing speed, as the club 100 moves through a swing, as will be discussed more fully below. In some arrangements, the golf club sleeve 200 may be removably connected to the shaft 106 to permit a user to selectively use the golf club sleeve 200 as desired, as will be discussed more fully below. Additionally or alternatively, the golf club sleeve 200 may be rotatably connected to the shaft 106 in order to permit the golf club sleeve 200 to rotate freely about the shaft 106. This arrangement may permit the golf club sleeve 200 to orient itself during a golf swing, as will be discussed more fully below.

In some examples, the golf club sleeve 200 may cover substantially all of the shaft 106 of the golf club in order to reduce drag associated with the shaft 106 during swinging of the club. For instance, the golf club sleeve 200 may generally extend from a grip region 110 of the golf club to the head region 120. More specifically, in some arrangements, the golf club sleeve 200 may extend from a bottom 112 of the grip 108 to the hosel 104 of the golf club 100. In some examples, the golf club sleeve 200 may be approximately 25 inches to 35 inches in length. In still other examples, the golf club sleeve 200 may be less than or equal to 32 inches in length. The length of the golf club sleeve 200 may, in some arrangements, be determined based on the length of the golf club 100 it will be used on. For instance, a golf club sleeve 200 that may be used on a driver or other wood-type golf club may be longer than a golf club sleeve 200 that may be used on an iron-type golf club. In still other examples, the length of the golf club sleeve 200 may be customized to fit an individual's specific club length. For instance, a set of clubs having a custom club length (i.e., longer or shorter than a standard club) may have a golf club sleeve 200 that is a customized length to fit that particular shaft length.

In still other examples, the golf club sleeve 200 may cover less than substantially all of the shaft 106 of the golf club. For instance, a portion of the shaft 106a may be exposed when the golf club sleeve 200 is connected to the golf club, as shown in FIG. 2B. However, the golf club sleeve 200 may generally cover a substantial portion of the shaft 106b. In arrangements in which less than all of the shaft 106 is covered by the golf club sleeve 200, a stop may be used to maintain the position of the sleeve 200 on the shaft 106. For instance, a gasket (not shown), such as a rubber gasket, may be connected to the bottom of the sleeve 200 to maintain the position of the sleeve 200 on the shaft 106. The gasket may be on the bottom of the sleeve 200 or contained within the sleeve 200. In some arrangements, a coating or other substance may be placed on the gasket in order to aid rotation of the sleeve 200 about the shaft 106.

Figure 3A:
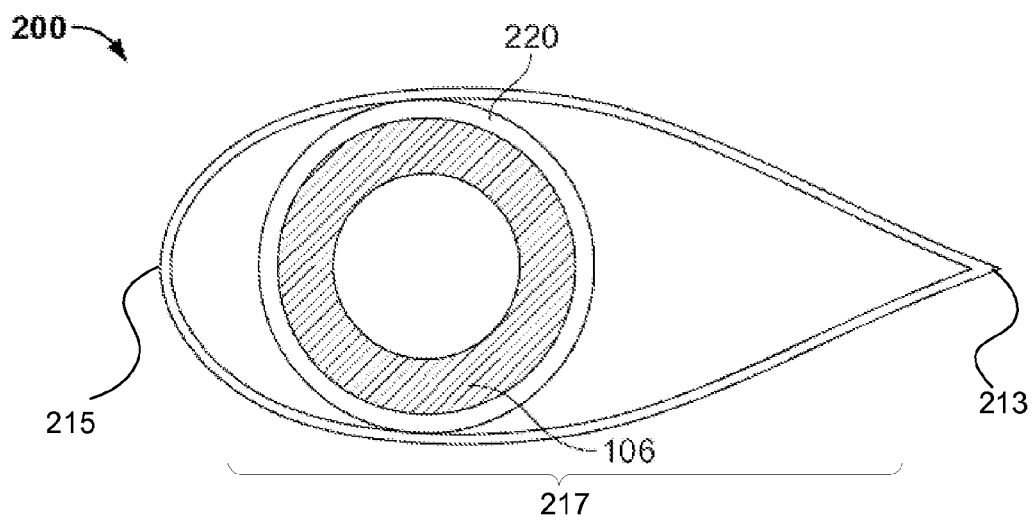
FIG. 3A is a cross sectional view of one example golf club sleeve that may be used in accordance with at least some examples of this invention.
Figure 3B:
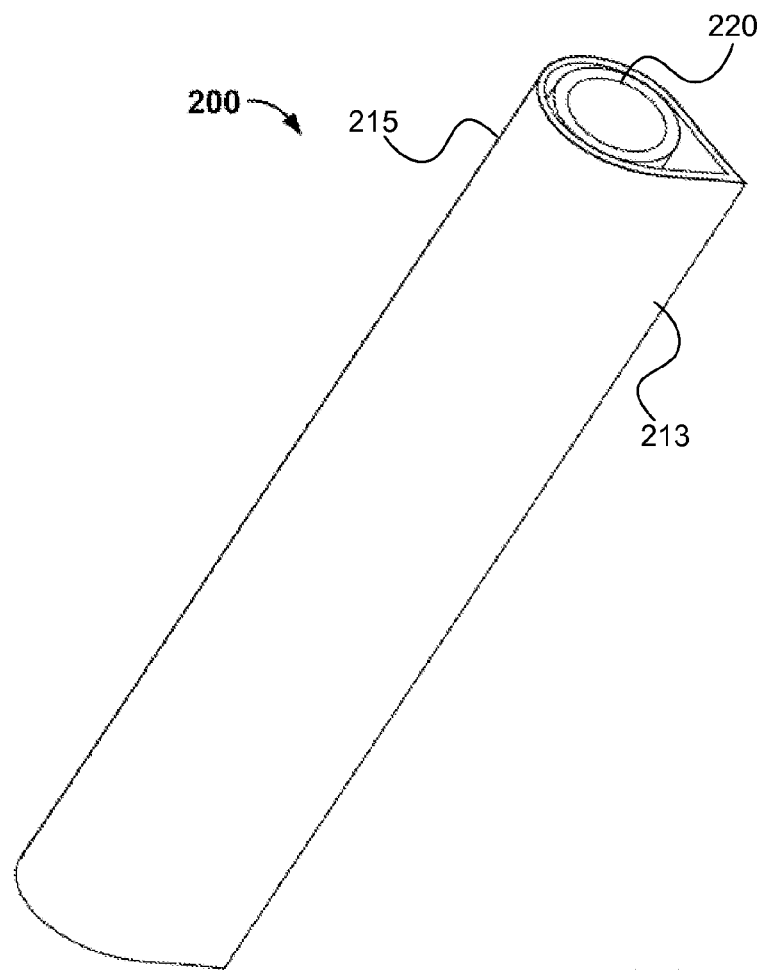
FIG. 3B is a perspective view of the example golf club sleeve of FIG. 3A in accordance with at least some examples of this invention.

FIGS. 3A and 3B illustrate a cross sectional view and a perspective view, respectively, of one example golf club sleeve 200 having an airfoil shape. Additional airfoil geometries may also be used, as will be discussed below. The airfoil shape depicted may be generally tear-drop shaped, having a leading edge 215, a midsection 217, and a trailing edge 213. In some examples, the length of the sleeve 200, i.e., the distance from the leading edge 215 to the trailing edge 213 may be between ¾ in. and 3 in. Further, the airfoil shaped golf club sleeve may be formed of a lightweight material and may be relatively thin in order to reduce weight and provide ease of rotation of the sleeve 200 around the shaft. For instance, the thickness of the sleeve may be between 0.5 and 5.0 mm in some examples.

In an exemplary embodiment, the thickness of the midsection 217 of the sleeve 200 may be greater, in at least a portion of the midsection 217, than the thickness at the leading edge 215 or trailing edge 213. Stated differently, the thickness of the sleeve 200 may be greatest at a point in the midsection 217. In some examples, the thickness of the midsection 217 may be between 0.25 inches and 0.75 inches. The golf club sleeve 200 may have a central aperture or bore 220 into which the shaft 106 of the golf club may fit when the golf club sleeve 200 is in use. This aperture 220 may be sized to correspond to the diameter of the shaft 106 in order to fit snugly with the shaft 106, while still permitting rotation of the golf club sleeve 200 relative to the shaft 106, as will be discussed below. For instance, the aperture 220 may have a diameter of 0.2 to 0.8 inches. In some arrangements, the diameter may be approximately 0.6 inches. In still other arrangements, the diameter of the aperture 220 may not be constant and instead may vary to fit the shaft 106 of the golf club. For instance, as a golf club shaft 106 tapers, the golf club sleeve aperture 220 may have a corresponding taper to provide a snug fit along the length of the shaft 106.

With further reference to FIG. 2A, to connect the golf club sleeve 200 to the golf club, the golf club sleeve 200 may, in some arrangements, slide over the shaft 106 to connect at the hosel 104, as described below. In other arrangements, the golf club sleeve 200 may separate at one side, i.e., the sleeve 200 may have a split at the trailing edge 213, and may have one or more closure mechanisms 250 located at the trailing edge 213 to connect the two sides of the golf club sleeve 200. For instance, the golf club sleeve 200 may have a zipper, hook and loop type fastener, snaps, snap fits, mechanical fasteners, and the like, associated with each side of the split that may connect the sides to secure the golf club sleeve 200 along the shaft 106. Thus, the golf club sleeve 200 may, in some arrangements, be sold as an after-market accessory that may be used with various golf clubs. In other arrangements, the golf club sleeve 200 may be sold with a particular golf club (such as a driver or other wood-type club) or set of clubs (such as iron-type clubs). In still other arrangements, the golf club sleeve 200 may be permanently connected to the golf club.

Figure 4:
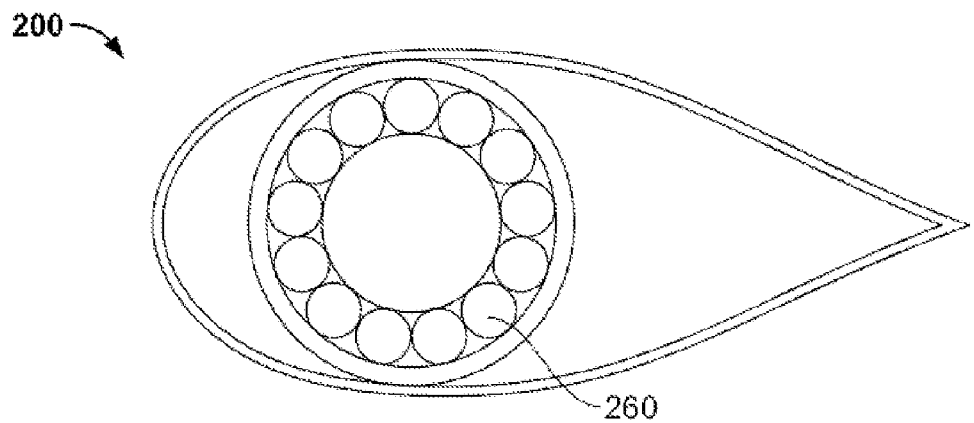
FIG. 4 is a cross sectional view of a connection region of one example golf club sleeve that may be used in accordance with at least some examples of this invention.

Further, the golf club sleeve 200 may be connected to the golf club at the hosel 104 or ferrule (not shown). In some arrangements, the golf club sleeve 200 may be connected to the golf club at a non-friction or reduced-friction transition member, such as ball bearings. Additionally or alternatively, lubrication may be added to the shaft and/or the sleeve 200 in order to aid in rotation of the sleeve 200. For instance, LANO-LUBE may be applied to the shaft and/or the sleeve 200, or portions thereof including the transition, in order to aid in rotation of the sleeve 200 around the shaft. FIG. 4 illustrates one arrangement in which a bearing member in the form of ball bearings 260 are used to rotatably connect the golf club sleeve 200 to the golf club 100 while minimizing friction. The cross-section shown in FIG. 4 depicts the ball bearings 260 on which the golf club sleeve 200 may rest or be connected. The non-friction transition member 260 may be positioned on or near the hosel 104. This arrangement aids in the rotation of the golf club sleeve 200 about the shaft 106 by reducing friction associated with the rotation of the golf club sleeve 200 relative to the shaft 106 and may aid in the golf club sleeve orienting itself during a golf swing, as discussed more fully below.

Figure 5A:
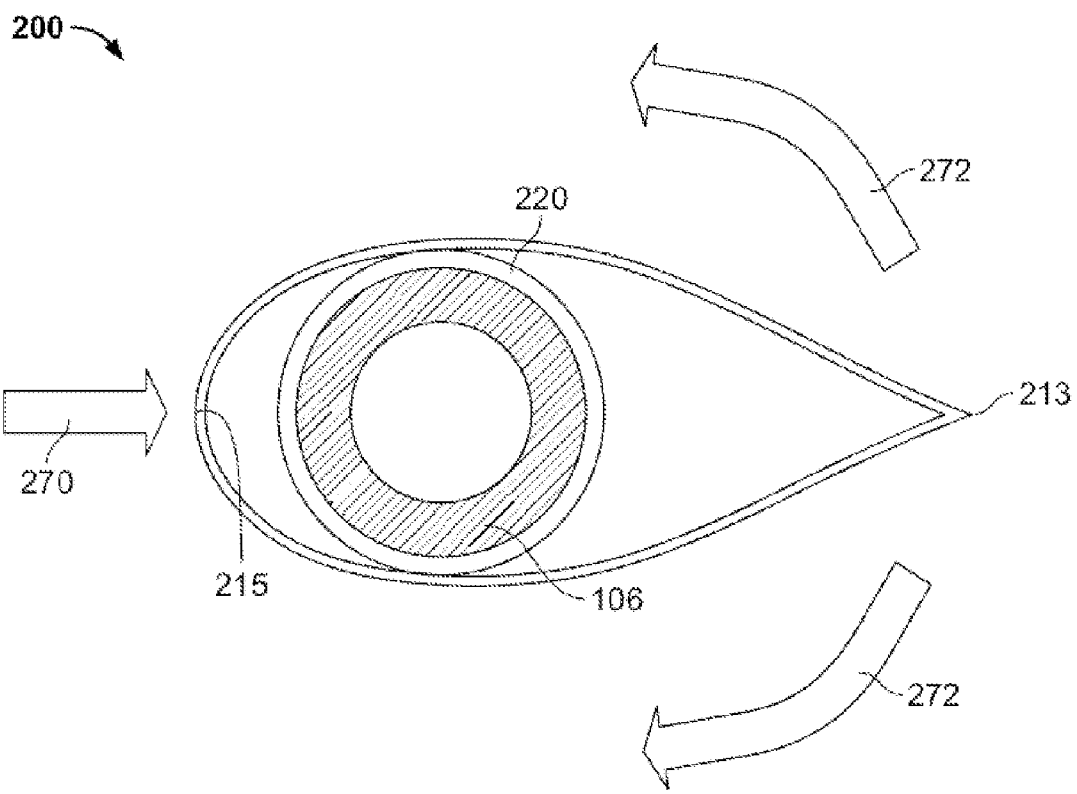
FIG. 5A is a cross sectional view of one example golf club sleeve illustrating air flow over the sleeve and rotation of the golf club sleeve in accordance with at least some aspects of this invention.

The golf club sleeve 200 may, as mentioned above, be rotatably connected to the shaft 106 in order to rotate relative to the shaft 106. This independent rotation may permit the golf club sleeve 200 to orient itself during a golf swing to improve air flow over the sleeve 200. Examples of air flow over the sleeve and associated rotation of the golf club sleeve 200 are shown in FIGS. 5A-5E. With reference to FIG. 5A, as the golf club is swung and air flows across the golf club sleeve 200 (as indicated by arrow 270), the pressure gradient caused by the air flow across the golf club sleeve 200 may cause the golf club sleeve 200 to rotate about the shaft. Arrows 272 illustrate movement of the golf club sleeve 200 around the shaft 106 due to the air flow and associated pressure gradient. The golf club sleeve 200 may rotate to a position in which it is oriented with the leading edge 215 and trailing edge 213 in appropriate positions during the swing to reduce drag associated with the shaft 106 of the golf club during the swing. For instance, FIGS. 5B-5E illustrate one example golf swing in which the golf club sleeve 200 rotates around the shaft 106 of the golf club. During a portion of a player's swing (e.g., backswing, downswing, etc.), the pressure gradient over the golf club sleeve 200 may orient the leading edge 215 in front of the shaft 106 (i.e., into the air flow) during the swing while the trailing edge 213 may be behind the shaft 106. This arrangement will orient the airfoil shaped golf club sleeve 200 to improve airflow over the sleeve 200 (and thus the shaft 106 of the golf club) in order to reduce drag during the swing, thereby increasing the speed of the swing.

Figure 5B:
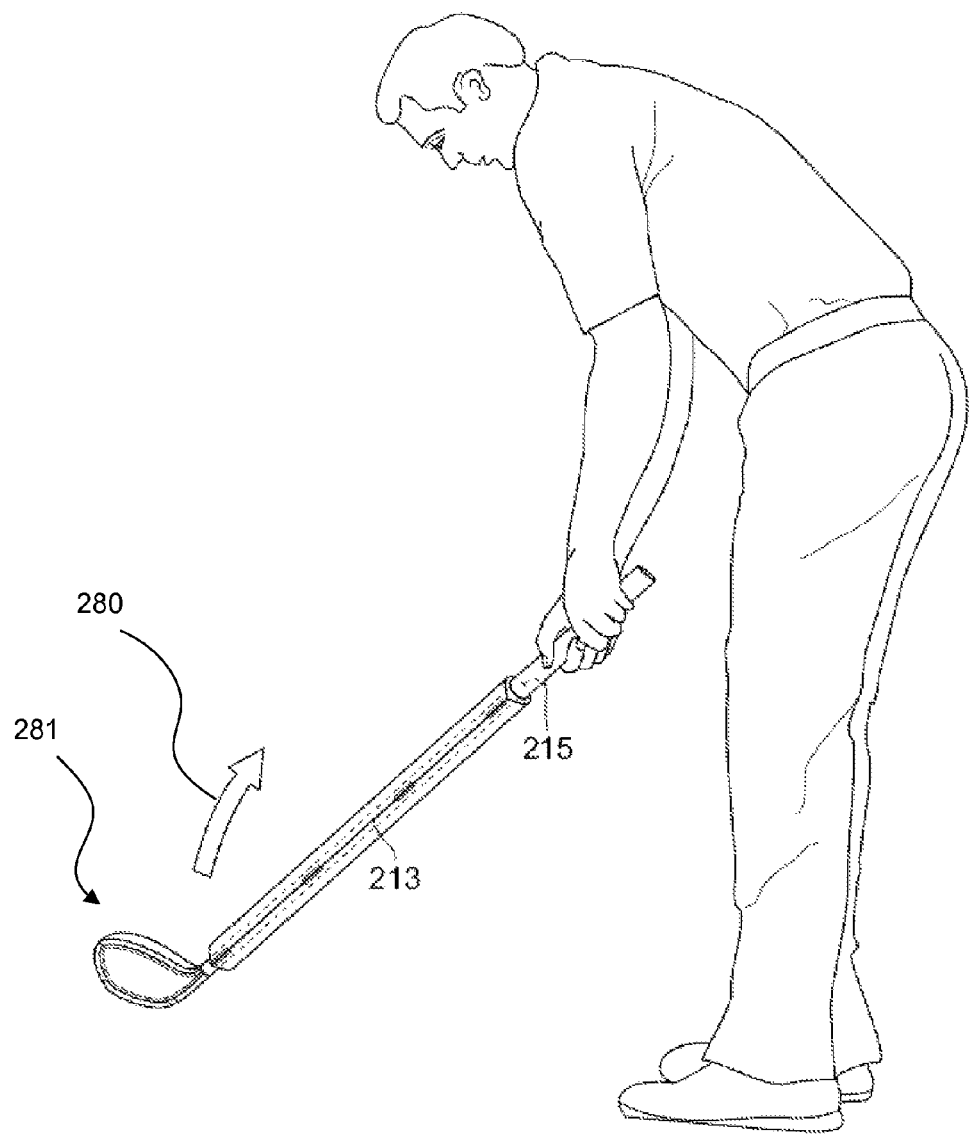
FIGS. 5B-5E further illustrate rotation of the golf club sleeve around the golf club shaft during a golf swing in accordance with at least some aspects of this invention.

FIG. 5B illustrates the golf club sleeve 200 during a start of an example backswing. As indicated by arrow 280, the golf club 281 is being pulled backward and upward. Accordingly, the leading edge 215 is shown in front of the shaft 106 in the backswing. That is, as the club 281 is pulled backward, the golf club sleeve 200 rotates around the shaft 106 such that the leading edge 215 is heading into the air flow ahead of or in front of the shaft 106 (which is covered by the sleeve 200) and the trailing edge 213 follows behind the shaft 106. This arrangement may improve airflow over the shaft 106 and sleeve 200.

Figure 5C:

FIG. 5C illustrates a golf club 281 at the beginning of a downswing. At this point, the player has begun to move the club 281 downward, as indicated by arrow 282.

Figure 5D:
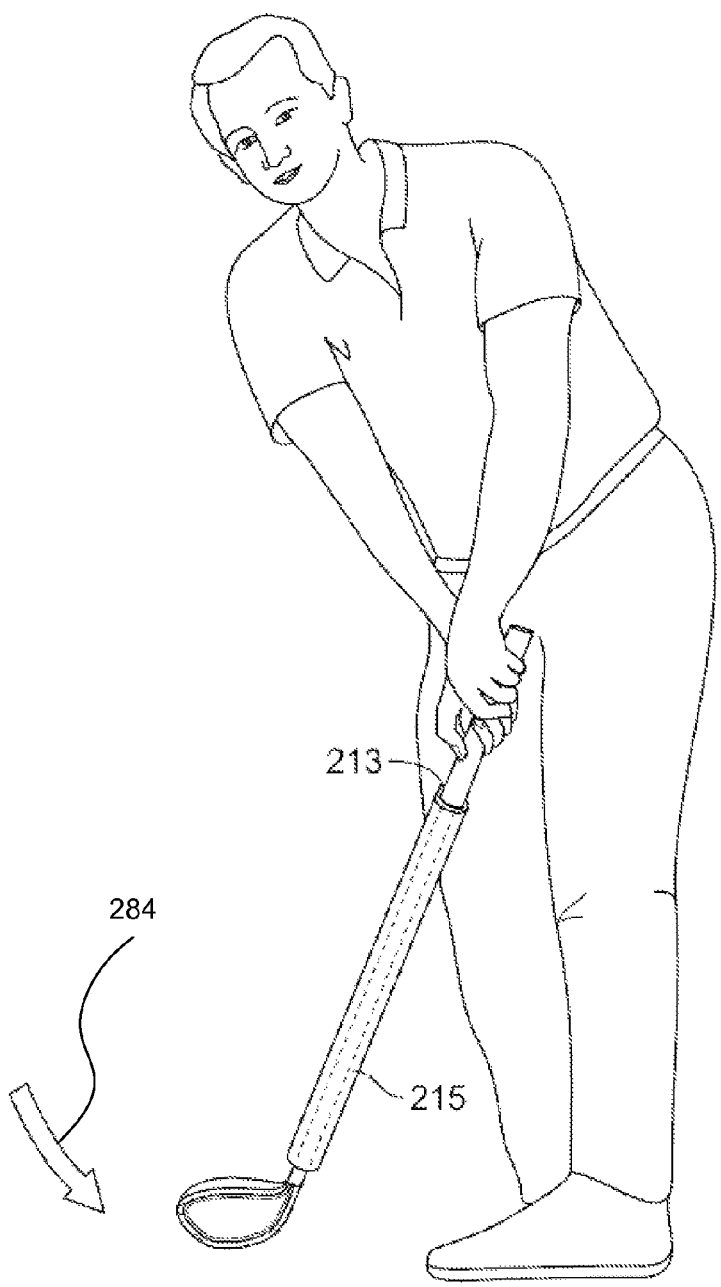
Figure 5E:

Accordingly, as air flows over the golf club 281, the golf club sleeve 200 will rotate around the shaft 106 to orient itself with the leading edge 215 in front of or ahead of the shaft 106 into the air flow and the trailing edge 213 behind the shaft. FIGS. 5D and 5E illustrate additional portions of the downswing and further illustrate rotation of the golf club sleeve 200 around the shaft 106. As the club moves through the downswing, the sleeve 200 orients itself (e.g., rotates around the shaft) to maintain a position with the leading edge 215 in front of the shaft 106 into the airflow and the trailing edge 213 behind the shaft through the remaining phases of the golf swing, as shown by arrows 284 and 286. This position with the leading edge into the air flow aids in improving air flow around the shaft 106 and sleeve 200 and may aid in increasing swing speed.

Figure 6A:
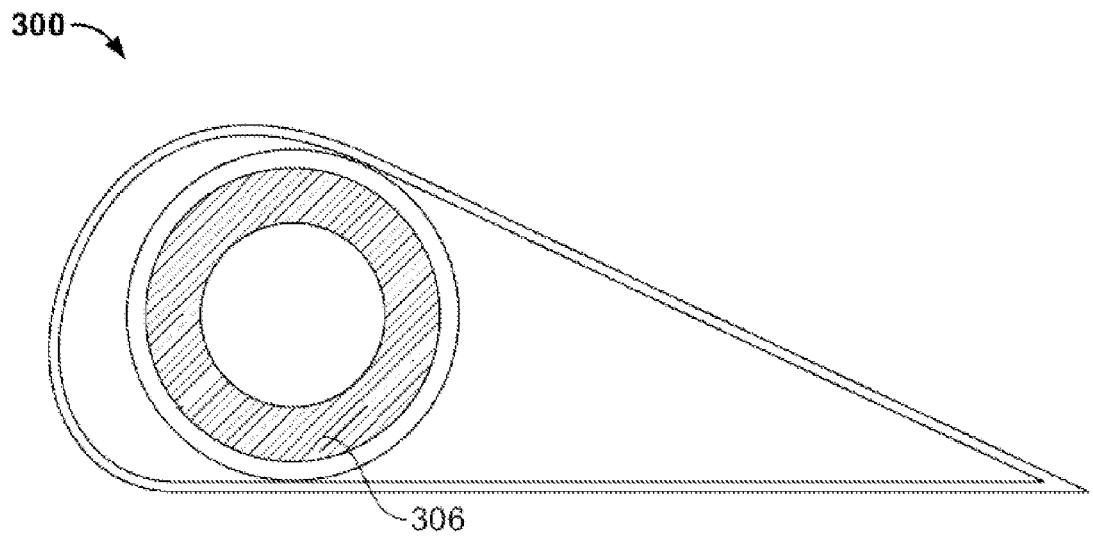
FIGS. 6A and 6B illustrate cross sections of example golf club sleeves having various airfoil geometries that may be used in accordance with at least some aspects of this invention.
Figure 6B:
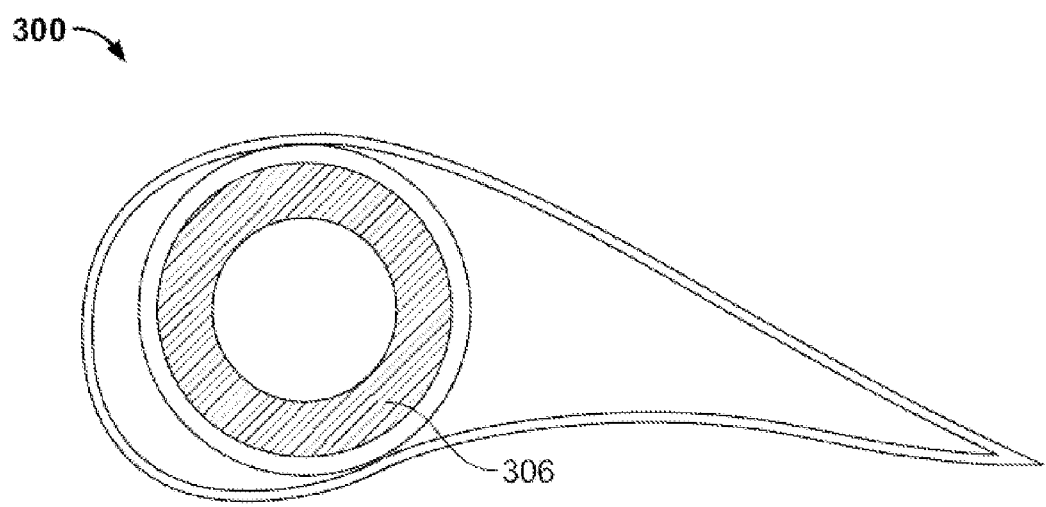

FIGS. 6A and 6B provide some additional example airfoil geometries that may be used with the golf club sleeve 300 in order to aid in reducing drag associated with the shaft 306 during swing. With the various airfoil geometries shown and discussed herein, as the shaft 306 of the golf club moves through the air, air flow over the airfoil shaped golf club sleeve 300 is increased due to the shape of the sleeve 300. This increase in air flow provides a corresponding increase in swing speed. Although the particular airfoil geometries in FIGS. 3-6B are shown and described, various additional airfoil geometries may be used without departing from the invention and nothing in the specification and figures should be viewed as limiting the golf club sleeve to only the airfoil geometries shown in the various figures.

With further reference to the arrangements of FIGS. 2A-5, while the airfoil shaped golf club sleeve 200 may aid in reducing drag during a golf swing, it may be desirable to minimize the additional weight associated with the golf club sleeve 200 in order to reduce the amount of total weight associated with a golf club. For example, in some arrangements, the golf club sleeve 200 may weigh between 10 and 70 grams. The golf club sleeve 200 may be made of various lightweight materials. For example, the golf club sleeve 200 may be formed of titanium, aluminum, alloys or combinations thereof, any suitable plastic material, polymers, thermosets, composite material, such as a carbon composite, and the like. The golf club sleeve 200 may be formed using conventional forming methods, such as molding, and the like. In some arrangements, the golf club sleeve 200 may be formed using a rapid prototyping additive fabrication technique, such as laser sintering, solid deposition modeling, stereolithography, and the like.

In some examples, the golf club sleeve 200 may be formed having varying surface textures. For instance, the golf club sleeve 200 may, in some examples, have a smooth surface. In other examples, the golf club sleeve 200 may have a texture or pattern formed in the exterior surface to provide improved air flow over the golf club sleeve 200 and/or improved aesthetic appearance.

Figure 7:
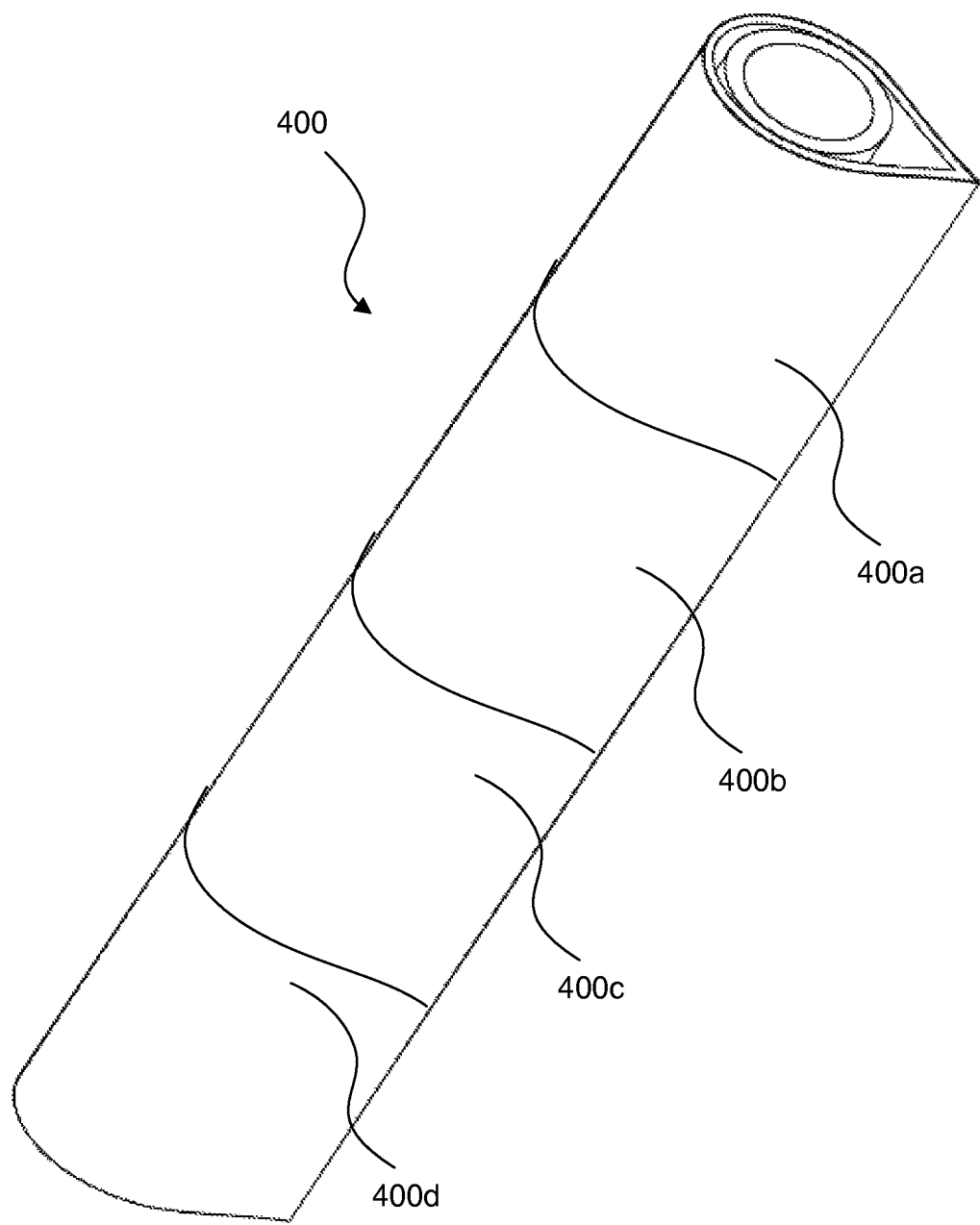
FIG. 7 illustrates an alternative arrangement of a golf club sleeve in accordance with at least some aspects of this invention.

In some alternative arrangements, the golf club sleeve may have an adjustable length. For instance, the sleeve may be formed of a plurality of shorter sleeves which may connect to each other (e.g., using known methods of attachment such as adhesives, hook and loop, snaps, buttons, mechanical fasteners, snap fits, etc.). One or more of the plurality of sleeves may be connected to each other to form a golf club sleeve of a desired length. For instance, FIG. 7 illustrates one example golf club sleeve 400 having a plurality of sleeve portions 400a-400d. Although four portions or sections are shown here, any desired number of sections or portions may be used. The portions 400a-400d may be removably connected to each other in order to shorten or lengthen the length of the golf club sleeve, as desired to suit the length of the club in use. In some examples, smaller or shorter portions may be used in order to make finer adjustments to the length of the sleeve.

In still other examples, the golf club sleeve may include various colors, patterns, logos, etc. For instance, a manufacturer logo may be placed on the golf club sleeve. In other arrangements, the golf club sleeve may be painted or otherwise include colors associated with a team, e.g., a college golf team, high school golf team, etc. In still other examples, the golf club sleeve may include a mascot or other identifier associated with a favorite team, such as a professional sports team, college sports team, a player's alma mater, and the like.

III. Conclusion

The present invention is described above and in the accompanying drawings with reference to a variety of example structures, features, elements, and combinations of structures, features, and elements. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims. For example, the various features and concepts described above in conjunction with FIGS. 1A through 7 may be used individually and/or in any combination or subcombination without departing from this invention.

What is claimed is:

1. A golf club, comprising:
   a golf club head;
   a shaft having a first end connected to the golf club head at a hosel;
   a golf club sleeve extending over the shaft and surrounding the shaft, the golf club sleeve having a drag-reducing airfoil shaped geometry, a closure mechanism for securing the golf sleeve to the shaft, and being formed of a substantially rigid material, the golf club sleeve being freely rotatable relative the shaft; and
   a reduced-friction transition surface connecting the golf club sleeve to the hosel.

2. The golf club of claim 1, wherein the golf club sleeve extends outward from the shaft on at least one side of the shaft.

3. The golf club of claim 1, wherein the airfoil shaped geometry is tear-drop shaped.

4. The golf club of claim 1, wherein the reduced-friction transition surface includes ball bearings.

5. The golf club of claim 1, wherein the golf club sleeve extends over substantially all of the shaft.

6. The golf club of claim 5, wherein the golf club sleeve is less than or equal to 32 inches in length.

7. The golf club of claim 1, wherein the golf club sleeve is rotatable relative to the shaft to orient the golf club sleeve during a golf swing.

8. The golf club of claim 1, wherein the golf club sleeve is formed of a composite material.

9. The golf club of claim 8, wherein the composite material is a carbon composite.

10. The golf club sleeve of claim 1, wherein the closure mechanism includes at least one of snap fits, mechanical fasteners, snaps, and hook and loop type closures.

11. A golf club, comprising:
    a golf club head;
    a shaft having a first end to which the golf club head is connected; and
    a golf club sleeve extending over the shaft and surrounding the shaft, the golf club sleeve having a cross-section corresponding to a drag-reducing airfoil and extending outward from the shaft, the golf club sleeve being removably connected to the golf club with at least one closure mechanism and rotatable relative to the shaft.

12. The golf club of claim 11, wherein the cross section corresponding to the airfoil includes a leading edge, a trailing edge, and a midsection extending between the leading edge and the trailing edge.

13. The golf club of claim 12, wherein a thickness of the golf club sleeve is greatest at a portion of the midsection.

14. The golf club of claim 11, wherein the at least one closure mechanism is located at a trailing edge of the golf club sleeve.

15. The golf club of claim 11, wherein the at least one closure mechanism includes at least one of snap fits, mechanical fasteners, hook and loop type closures, and snaps.

16. The golf club of claim 11, wherein the golf club sleeve connects to the golf club at a hosel and the connection includes a reduced-friction transition.

17. The golf club of claim 16, wherein the reduced-friction transition is ball bearings.

18. The golf club of claim 11, wherein the golf club sleeve includes an aperture extending through the golf club sleeve and corresponding to the size of the shaft.

19. The golf club of claim 18, wherein the aperture is approximately 0.6 inches in diameter.

20. The golf club of claim 18, wherein the aperture is tapered.

21. A golf club sleeve, comprising:
    a sleeve body having an airfoil shaped cross section and a closure mechanism, the sleeve body including a leading edge, a trailing edge and a mid-section extending between the leading edge and the trailing edge, wherein a thickness of the sleeve body in at least a portion of the midsection is greater than a thickness of the sleeve body at the leading edge and the trailing edge; and
    an aperture extending through the airfoil shaped sleeve body, the aperture being sized to correspond to a shaft of a golf club.

22. The golf club sleeve of claim 21, wherein the aperture extends through the entire length of the golf club sleeve body.

23. The golf club sleeve of claim 21, wherein the aperture is between 0.4 and 0.8 inches in diameter.

24. The golf club sleeve of claim 21, wherein the aperture is tapered.

25. The golf club sleeve of claim 21, wherein the sleeve is rotatable relative to the shaft of the golf club when connected to the golf club.

26. The golf club sleeve of claim 21, wherein the sleeve extends over substantially all of the shaft of the golf club when connected to the golf club.

27. The golf club sleeve of claim 21, wherein the sleeve body is less than or equal to 32 inches in length.

28. The golf club sleeve of claim 21, wherein the airfoil shaped cross section is a tear drop shape.

29. The golf club sleeve of claim 21, wherein the sleeve body is formed of a rigid material.

30. The golf club sleeve of claim 29, wherein the rigid material is a composite material.

31. The golf club sleeve a sleeve of claim 30, wherein the composite material is a carbon composite material.

32. The golf club sleeve of claim 21, wherein the closure mechanism is located at the trailing edge of the sleeve body.

33. The golf club sleeve of claim 21, wherein the closure mechanism includes at least one of snap fits, mechanical fasteners, snaps, and hook and loop type closures.

* * * * *